A. Snyder's

Fly Trap.

75480

PATENTED
MAR 10 1868 witnesses.
J. L. Meriam
A. Hayward,

INVENTOR.
Albert Snyder
By his Attorney
Geo. D. Chapin

United States Patent Office.

ALBERT SNYDER, OF JACKSON, MICHIGAN.

Letters Patent No. 75,480, dated March 10, 1868.

IMPROVED FLY-TRAP.

*The Schedule referred to in these Letters Patent and making part of the same.*

TO ALL WHOM IT MAY CONCERN:

Be it known that I, ALBERT SNYDER, of Jackson, in the county of Jackson, and State of Michigan, have invented an Improved Fly-Trap; and I do hereby declare that the following is a full, clear, and exact description of the construction and operation of the same, reference being had to the annexed drawings, making a part of this description, in which—

Figure 1:
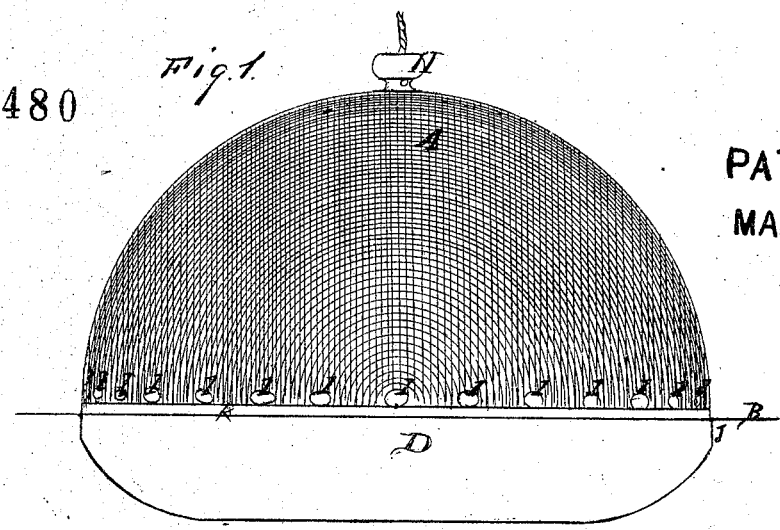

Figure 1 is an elevation of my trap.

Figure 2:
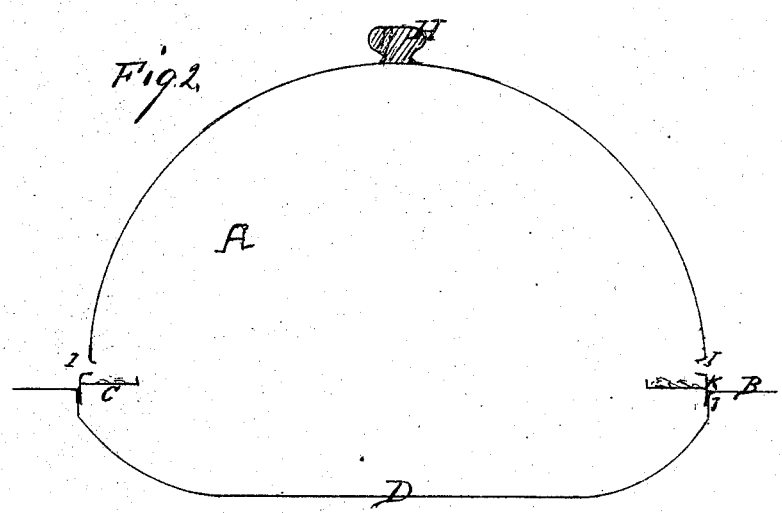

Figure 2 a section of the same.

The nature of my invention consists in the use of a suitable basin for holding liquid and supporting a dome of wire cloth, having a series of holes punched through it from the outside, and also a platform extending around the inside and a little below the holes, for the purpose of holding such material as will attract flies.

In order to give a correct understanding of my invention, I have marked corresponding parts with similar letters, and will now give a detailed description.

D represents a common tin basin, having a rim, B, on which the flies may light before entering the trap, and also has a short vertical periphery, J, in order that the rim K of dome A may fit closely inside of the basin, and be held in place when the trap is being carried about the house or is to be hung up. Catches, however, may be used to hold the dome to the basin, if desirable. The dome A is made of common wire cloth, and may have any convenient form, but should correspond with the style of basin D in order to fit it closely. Holes I I I, &c., are punched through dome A in such a manner as to have the sharp points of the wires project inward, as seen at fig. 2, in order that after the flies have passed through said holes they will find it difficult to escape. A platform, C, is rigidly attached to the dome A, a little below the holes I I I, &c., for the purpose of holding bait and inducing flies to enter the trap. Water, or some other kind of fluid, should be put in the basin D, in order that flies falling therein may be destroyed. When the trap is to be cleaned, the dome A can be readily lifted out of the basin D, which will admit of all parts of the trap being reached.

Having thus fully described my device, what I claim, and desire to secure by Letters Patent, is—

The combination of the dome A and platform C with the holes I I, dish D, and rim B, as and for the purpose set forth.

ALBERT SNYDER.

Witnesses:
GEO. L. CHAPIN,
A. HAYWARD.